US008776650B2

(12) United States Patent
Iguchi

(10) Patent No.: US 8,776,650 B2
(45) Date of Patent: Jul. 15, 2014

(54) PUNCH UNIT, SHEET POST-PROCESSING APPARATUS HAVING THE SAME, AND METHOD OF PUNCHING SHEETS

(75) Inventor: Ken Iguchi, Sunto-gun (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/633,394

(22) Filed: Dec. 8, 2009

(65) Prior Publication Data

US 2010/0147121 A1 Jun. 17, 2010

Related U.S. Application Data

(63) Continuation of application No. 11/533,087, filed on Sep. 19, 2006, now Pat. No. 7,650,823.

(30) Foreign Application Priority Data

Sep. 20, 2005 (JP) ................................ 2005-271878
Jan. 17, 2006 (JP) ................................ 2006-008848
Jun. 30, 2006 (JP) ................................ 2006-181746

(51) Int. Cl.

*B23Q 15/00* (2006.01)
*B26D 5/28* (2006.01)
*B26D 1/00* (2006.01)
*B26D 1/12* (2006.01)
*B65B 33/04* (2006.01)
*B65H 39/00* (2006.01)

(52) U.S. Cl.
USPC ...... 83/13; 83/73; 83/211; 83/669; 270/58.08

(58) Field of Classification Search
USPC .......... 83/515, 669, 687, 934, 56, 614, 425.4, 83/698.71, 13, 73–76, 209, 211; 270/1, 270/58.08
See application file for complete search history.

(56) References Cited

U.S. PATENT DOCUMENTS 5,169,140 A * 12/1992 Wenthe, Jr. .................. 271/228
5,239,904 A 8/1993 Yamaguchi et al.
5,794,176 A * 8/1998 Milillo .......................... 702/150
6,014,920 A 1/2000 Yamauchi et al.
6,065,383 A * 5/2000 Takaishi et al. ................ 83/368
6,353,726 B1 3/2002 Murata et al.
6,381,443 B1 4/2002 Kawata et al.
6,386,080 B1 5/2002 Okamoto et al.
6,578,844 B2 * 6/2003 Acquaviva et al. ........... 271/228
6,622,908 B2 9/2003 Fukumoto et al.

(Continued)

FOREIGN PATENT DOCUMENTS

JP 09-244325 * 9/1997 ............ G03G 15/00
JP 10-194557 7/1998
JP 11-092020 4/1999
JP 2004-009245 1/2004

*Primary Examiner* — Ghassem Alie
*Assistant Examiner* — Bharat C Patel
(74) *Attorney, Agent, or Firm* — Amin, Turocy & Watson, LLP

(57) ABSTRACT

A hole punch unit has a punching section, a longitudinal registering mechanism, and a transverse registering mechanism. The registering mechanisms incline the punching section in accordance with a skew of a sheet. The punching section thus corrected in position punches the sheet. The punching section is corrected in position, at both the leading edge of the sheet and the trailing edge thereof, thus increasing the precision of positioning the punching section and shortening the time required to position the punching section.

8 Claims, 6 Drawing Sheets

(56) References Cited

U.S. PATENT DOCUMENTS

| | | | | |
|---|---|---|---|---|
| 6,834,853 | B2 * | 12/2004 | Trovinger et al. | 271/227 |
| 6,845,227 | B2 * | 1/2005 | Nishino et al. | 399/406 |
| 6,907,806 | B1 * | 6/2005 | Okamoto et al. | 83/76.8 |
| 7,007,577 | B2 | 3/2006 | Okamoto et al. | |
| 2001/0049990 | A1 * | 12/2001 | Takaishi et al. | 83/628 |
| 2002/0079640 | A1 * | 6/2002 | Yoshie et al. | 271/176 |
| 2003/0116004 | A1 | 6/2003 | Tanaka et al. | |
| 2003/0156872 | A1 | 8/2003 | Hirai | |
| 2004/0094891 | A1 * | 5/2004 | Trovinger et al. | 271/227 |
| 2004/0239027 | A1 * | 12/2004 | Trovinger et al. | 271/227 |

* cited by examiner

PUNCH UNIT, SHEET POST-PROCESSING APPARATUS HAVING THE SAME, AND METHOD OF PUNCHING SHEETS

CROSS-REFERENCE TO RELATED APPLICATIONS

This application is Continuation of co-pending application Ser. No. 11/533,087 filed on Sep. 19, 2006, the entire content of which is incorporated herein by reference.

This application is based upon and claims the benefit of priority from the prior Japanese Patent Applications No. 2005-271878, filed on Sep. 20 2005, No. 2006-8848, filed on Jan. 17 2006, and No. 2006-181746, filed on Jun. 30 2006; the entire content of which are incorporated herein by reference.

BACKGROUND OF THE INVENTION

1. Field of the Invention

The present invention relates to a punch unit for punching sheets, a sheet post-processing apparatus having the punch unit, and a method of punching sheets. More particularly, the invention relates to a punch unit that can deal with a skew of sheets, a sheet post-processing apparatus that has the punch unit, and a method of punching sheets.

2. Description of the Related Art

In recent years, a sheet post-processing apparatus is provided at the sheet-ejecting unit of an image forming apparatuses, in order to perform sheet post-processing, such as stapling or punching, on sheets having images formed on them.

Punching for filing sheets is performed by a punch unit on the sheets transported to the punch unit. If the sheets are skewed, or inclined to a prescribed straight line, the holes made in the sheets by punching will be skewed, too. That is, if the sheets are skewed and inserted in an inclined state, errors will be made in terms of the position and shape of the holes. Consequently, the position accuracy of holes cannot be achieved.

Hitherto, various systems have been proposed to correct a skew of sheets. In one system, the leading edge of a sheet is detected by a sensor, the degree of skew is calculated, and the punch unit is inclined (see, for example, Jpn. Pat. Appln. Laid-Open Publication No. 2004-9245 and Jpn. Pat. Appln. Laid-Open Publication No. 9-244325). In another system, a CCD line sensor is used to find the degree of skew from the feeding rate and the deviation of a side of the sheet (see, for example, Jpn. Pat. Appln. Laid-Open Publication No. 10-194557).

If the skew of a sheet is detected at the leading edge, however, it is impossible to correct the skew that occurs after the leading edge of the sheet has passed the sensor and before the trailing edge passes the sensor. If longitudinal registration is performed when the sensor detects this skew at the trailing edge, there will be no time to correct the skew.

BRIEF SUMMARY OF THE INVENTION

It is an object of the present invention to provide a punch unit that corrects the skew of a sheet at the leading edge and trailing edge of the sheets.

In an aspect of the present invention, there is provided a punch unit that includes:

a punching section configured to punch a sheet transported;

first and second detecting units which are located on an upstream side of the punching section, which are spaced apart in a line intersecting at right angles with a direction in which the sheet is transported, and which are configured to detect passages of the leading edge and trailing edge of the sheet;

a first calculation unit which calculates a transverse-direction skew at the leading edge of the sheet, from the detection results of the first and second detecting units;

a second calculation unit which calculates a transverse-direction skew at the trailing edge of the sheet, from the detection results of the first and second detecting units;

a punching-section rotating mechanism which has a rotation center existing outside the maximum width of the sheet and which rotates the punching section back and forth in the direction in which the sheet is transported;

a punching-section driving mechanism which moves the punching section in the sheet width direction; and a control unit which drives the punching-section rotating mechanism and the punching-section driving mechanism in accordance with the result of calculation made by the first calculation unit or the second calculation unit, to orientate the sheet at right angles to the punching section, thereby enabling the punching section to punch the sheet.

DETAILED DESCRIPTION OF THE INVENTION

Figure 1:
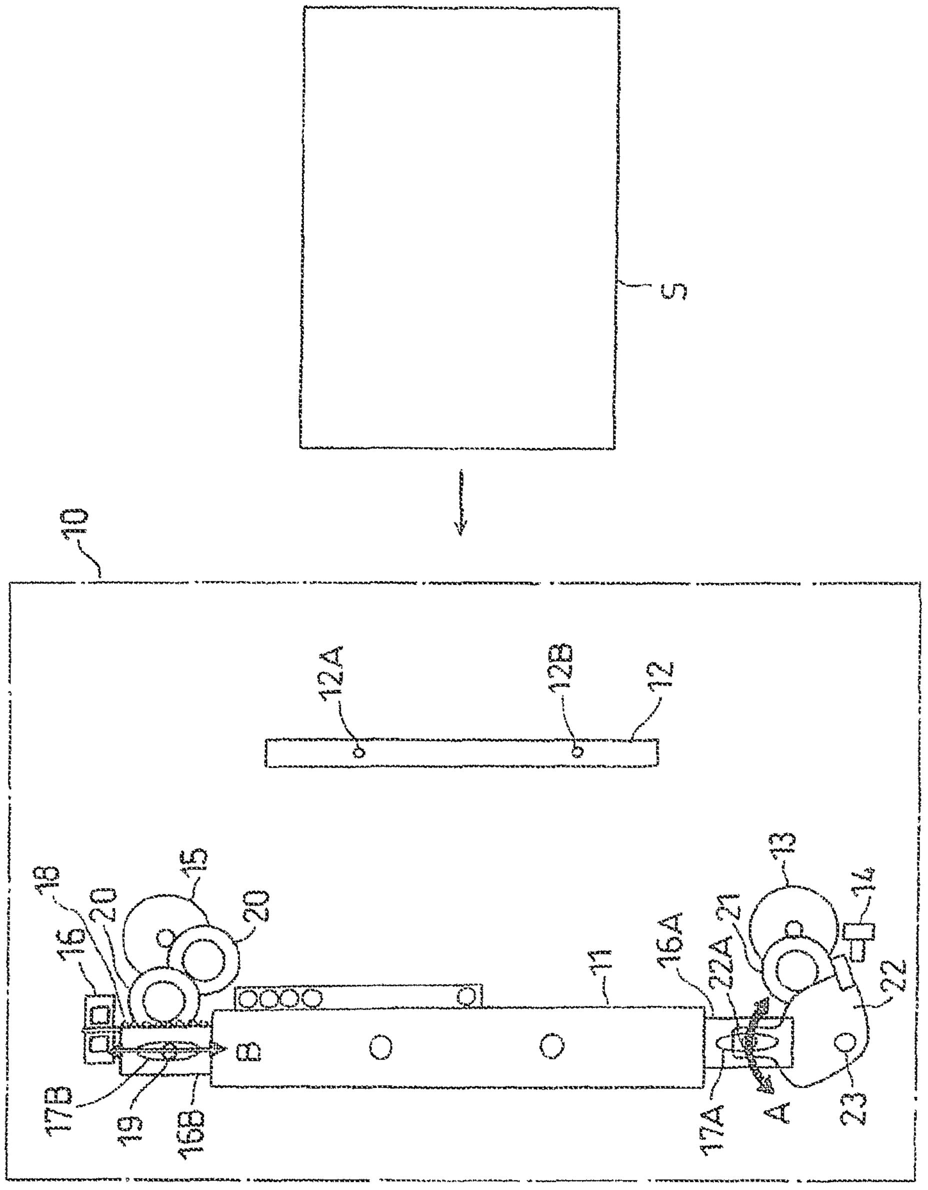
FIG. 1 is a diagram explaining the positional relation of a sheet S to a punching section and a skew-detecting section.

An embodiment of the present invention will be described, with reference to the accompanying drawings. Any identical component is designated at the same reference numeral in each figure and will not be described repeatedly.

Most image forming apparatuses (not shown), such as copiers, comprise an image-processing unit, an image-writing unit, an image-forming unit, a sheet cassette, a sheet-feeding means, a sheet-transporting unit, a sheet-transferring/separating unit, a fixing unit, a sheet-ejecting means, and a control unit.

The image forming apparatus further has, on the top thereof, an image-reading device and an operation unit. The image-reading device comprises an automatic document-feeding mechanism and a document-image scanning/exposure system. The operation unit has a punch key, a display panel, an input key, a ten-key pad, a clear key for the ten-key pad, a reset key, a stop key, and a start key. The user may operate the operation unit to designate various operating modes, the number of copies desired, the punching process, and the like.

Sheets having images formed by the image forming apparatus are ejected by sheet-ejecting rollers and supplied to a sheet post-processing apparatus (not shown) so that they may be grouped, stapled and punched.

The sheet post-processing apparatus has, as basic components, a waiting tray, a processing tray, a stapler, a punch unit, sheet-receiving trays, and the like. The punch unit includes a punching device. If the user has selected the punch mode, the punch unit punches the sheets on which images have been formed, so that the sheet may be well filed. The sheets thus punched and having holes are ejected onto one of the sheet-receiving trays. Any sheets that need not be punched are fed through a transport path, each passing through the nip between, for example, sheet-ejecting rollers, and are then ejected onto another sheet-receiving tray. The punch unit punches the sheets while the sheet post-processing apparatus is set to the punch mode because the punch key has been pushed at the operation unit.

The configuration of the punch unit will be described in detail, with reference to the drawing. In each figure, some components are not shown for simplicity of explanation. FIG. 1 is a diagram explaining the positional relation of a sheet S to a punching section and a skew-detecting section.

As shown in FIG. 1, the punch unit 10 comprises a punching section 11, a skew-detecting section 12, a longitudinal-registering motor 13, a longitudinal HP sensor 14, a transverse-registering motor 15, and a transverse HP sensor 16. The longitudinal HP sensor 14 detects the home position (HP) that the punching section 11 takes in the longitudinal position. The transverse HP sensor 16 detects the home position (HP) that the punching section 11 takes in the transverse direction (the direction perpendicular to the sheet transporting direction).

The punching section 11 punches sheets, in cooperation with the transport guide (transport path) and transport rollers (transport means), which are provided in the sheet post-processing apparatus. The punching section 11 intersects at right angle with the direction in which the sheets S are transported. It straddles the transport path.

The punching section 11 is configured to move in the longitudinal direction (the same direction the sheets are transported) and the transverse direction (the direction perpendicular to the direction the sheets are transported). To enable the punching section 11 to move so, the longitudinal-registering motor 13 and the transverse-registering motor 15 are arranged on the sides of the punching section 11, respectively. A tongue strip 16A is secured to one side of the punching section 11, and a tongue strip 16B to the other side of the punching section 11. The tongue strips 16A and 16B have elongated holes 17A and 17B, respectively. As FIG. 1 shows, the tongue strip 16B located at the transverse-registering motor 15 has a rack 18. A fixed axle 19 is secured to the main body of the sheet post-processing apparatus and fitted in the elongated hole 17B of the tongue strip 16B. When controlled by the control unit, the transverse-registering motor 15 is a motor that adjusts the distance the punching section 11 may move. More precisely, the motor 15 drives the punching section 11 in the transverse direction, i.e., direction B shown in FIG. 1. Idler gears 20 are provided, one of which is set in mesh with the shaft of the transverse-registering motor 15. Another idler gear 20 is set in mesh with the rack 18. Hence, the punching section 11 can move in the transverse direction for a distance equal to the length of the elongated hole 17B, while guided by the fixed axle 19.

On the other hand, the longitudinal-registering motor 13 is a motor that adjusts the angle by which the punching section 11 may rotate, when it is controlled by the control unit. That is, the motor 13 rotates the section 11 in the longitudinal direction, i.e., direction A shown in FIG. 1. Idler gears 21 are provided, one of which is set in mesh with the shaft of the longitudinal-registering motor 13. Another idler gear 21 is set in mesh with a gear 22. This gear 22 has a lever shaft 22A at one end. The gear 22 having the lever shaft 22A is mounted on a shaft 23 that is secured, at the other end, to the main body of the sheet post-processing apparatus. Thus, when the gear 22 is rotated around the shaft 23 in accordance with the rotation of the motor 13, the lever shaft 22A rotates the tongue strip 16A. As a result, the punching section 11 can be moved in the longitudinal direction.

The longitudinal-registering motor 13 and the transverse-registering motor 15 are arranged outside the broadest sheet S that the punch unit 10 can punch. It is desired that stepping motors be employed as these motors 13 and 15.

The skew-detecting section 12 has a first skew-detecting sensor 12A and a second skew-detecting sensor 12B. The section 12 is fixed to the punch unit 10.

The transport guide is arranged to control the transverse displacement of sheets S.

The transport rollers are driven by a transport-roller motor (not shown) at such a rotational speed that they have a predetermined circumferential speed. They transport each sheet S coming from the upstream side (i.e., the inlet port of the punch unit), to the downstream side (i.e., the outlet port of the punch unit) at transport speed V.

Figure 3:
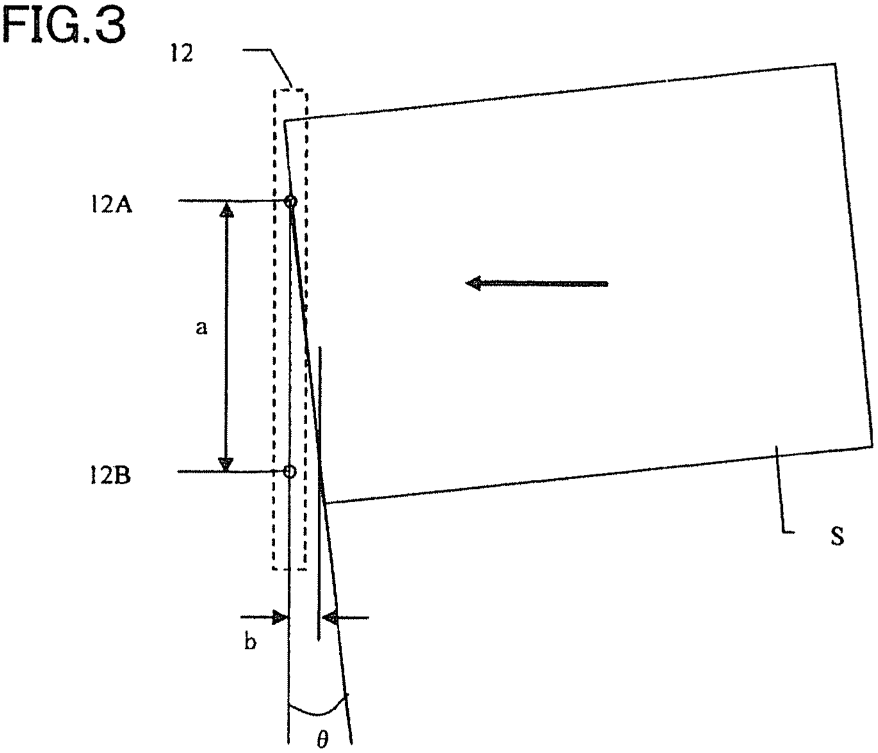
FIG. 3 is a diagram explaining a method of measuring a skew.

The first skew-detecting sensor 12A and the second skew-detecting sensor 12B are positioned at the upstream side of the punch unit 10. They detect the passage of the leading and trailing edges of each sheet S transported to the skew-detecting section 12. As shown in FIG. 3, the first skew-detecting sensor 12A and the second skew-detecting sensor 12B are arranged inside the narrowest sheet S that the punch unit 10 can punch. They are spaced apart from each other by a distance a and arranged in a line intersecting at right angles with the sheet-transporting direction.

The first skew-detecting sensor 12A that detects the passage of the trailing edge of each sheet (the sensor 12B may instead detect the passage of the trailing edge) should be positioned with respect to the punching section 11 so that $L \leq M$, where L is the distance between the trailing edge of the sheet and the center of the hole to be made in the sheet, and M is the distance between the first skew-detecting sensor 12A (or sensor 12B) and the center of the hole. If the sensor 12A is so positioned, the sheet need not be transported backwards in order to be punched.

The skew-detecting sensors 12A and 12B can be transmission-type photosensors. The detection signals they generate are sent to the controller, which will be described later. The controller has two timer counters. One timer counter starts measuring time when the first skew-detecting sensor 12A detects the passage of the leading edge of the sheet S. The other timer counter starts measuring time when the second skew-detecting sensor 12B detects the passage of the leading edge of the sheet S. If the sheet S is not inclined at all to the transport direction, the skew-detecting sensors detect the passage of the leading edge at the same time. In this case, the timer counters starts measuring time at the same time. That is, there is no time lag between the timer counters.

If the sheet S has a skew and is transported in an inclined position, however, a time lag will develop between the passages of the sheet S, detected by the skew-detecting sensors 12A and 12B.

The punching section 11 can be of the known type. It has, for example, a punching blade, a punch die, a sheet guide, a reset spring, and the like. The punching section will not be described in detail since the present invention does not relate to the punching section per se.

Figure 7:
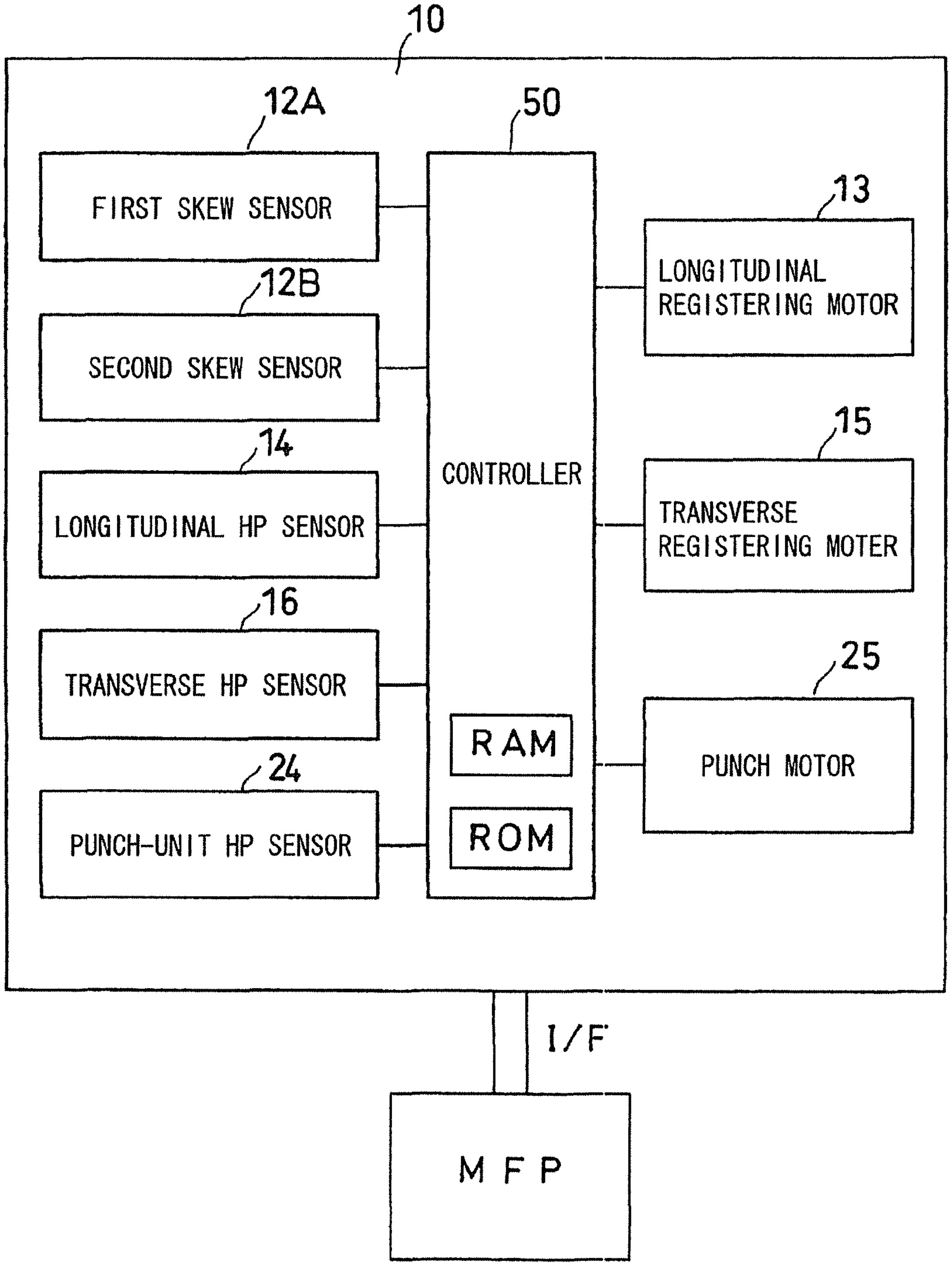
FIG. 7 is a block diagram showing the punch unit.

The control system for driving the punch unit 10 will be briefly described. As FIG. 7 shows, the control system has a controller 50 that comprises a central processing unit (CPU). The controller 50 has a RAM and a ROM. The controller 50 is connected to the longitudinal-registering motor 13, the transverse-registering motor 15, the first skew-detecting sensor 12A, the second skew-detecting sensor 12B, the longitudinal HP sensor 14, the transverse HP sensor 16, a punch-unit HP sensor 24, a punch motor 25, and the like. The controller 50 can therefore receive detection signals from the sensors. The controller 50 is connected to the image forming apparatus by an interface (I/F). Hence, the controller 50 can receive from the image forming apparatus the signals informing, for example, whether sheets S will be transported from the apparatus and whether the sheets S transported should be punched (that is, whether the punch mode has been designated).

Figure 2:
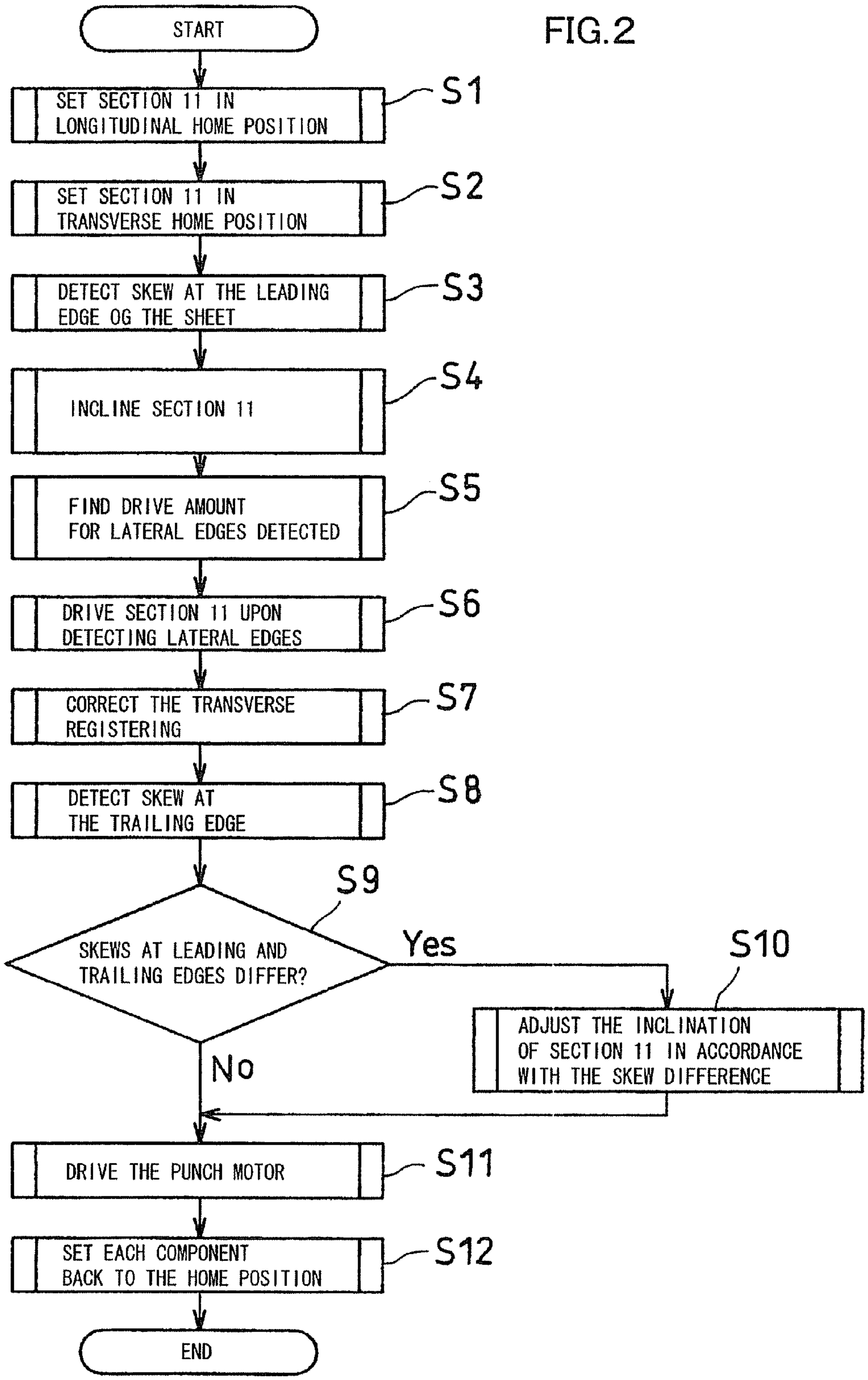
FIG. 2 is a flowchart explaining how a punch unit according to an embodiment of this invention operates.

How the punch unit operates to punch a sheet S, making holes in the trailing edge thereof will be explained, with reference to the flowchart of FIG. 2.

First, the user turns on the punch key of the operation unit and operates the ten-key pad and the like, designating the positions of holes to be made. When the punch key is turned on, the display panel displays an instruction message. In accordance with this message, the user inputs the positions of the holes to be made.

Upon inputting the hole positions, the user pushes the print key. The transport of sheets S is thereby started. If no hole positions are input, the sheet S will be punched at the positions which are represented by data stored in a memory (not shown) and which accord with the sheet size detected by a sheet-size sensor.

The sheet S is transported from the upstream side of the punch unit 10. At this time, the punching section 11 is set at the longitudinal and transverse home positions detected by the longitudinal HP sensor 14 and the transverse HP sensor 16, respectively (Step S1, Step S2). It does not matter which home position is set first, the longitudinal home position or the transverse home position.

When the leading edge of the sheet S comes to the skew-detecting section 12, a first skew of the sheet S is detected (Step S3).

A method of measuring a skew will be explained with reference to FIG. 3. Assume that a sheet S has been inserted in a skewed state as shown in FIG. 3. Since the sheet S has been inserted forwards, the first skew sensor 12A is first intercepted. A skew-error distance b is then determined from the transport speed V and the time passed until the second skew sensor 12B is intercepted. Since the first skew sensor 12A and the second skew sensor 12B are fixed in place and they are spaced apart by distance a, the skew angle θ can be given from the following equation:

$$b=a\times\tan\theta \tag{1}$$

Figure 4:
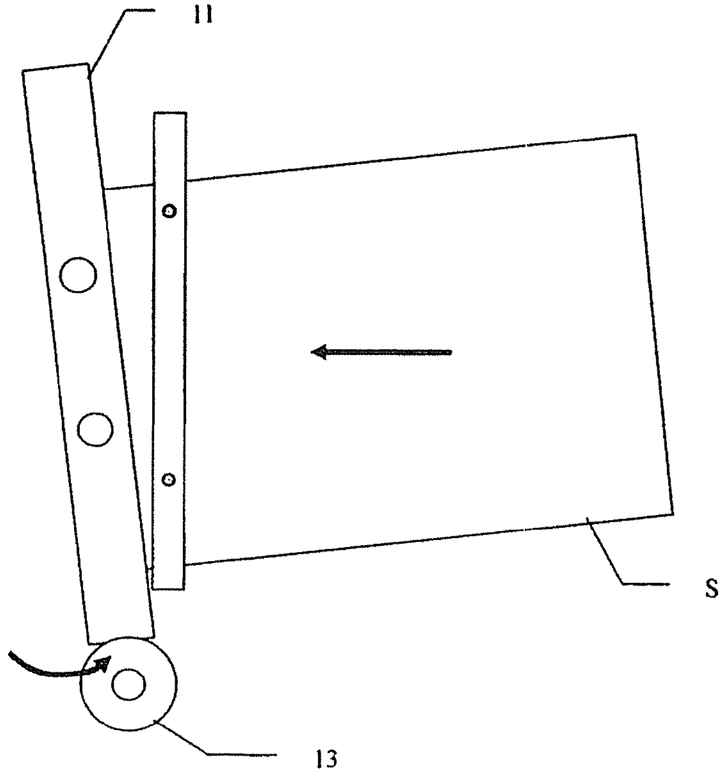
FIG. 4 is a diagram explaining how the punch unit is driven to correct the skew.

After the skew angle θ has been obtained, the longitudinal-registering motor 13 is driven by pulses the number of which corresponds to the angle θ. The punching section 11 is thereby inclined. The first skew is thus corrected (Step S4). How the motor 13 is driven to accomplish this skew correction is schematically shown in FIG. 4.

Subsequently, an actual drive amount is calculated from the detection of the lateral edges of the sheet (Step S5).

Then, the lateral edges of the sheet S are detected, and the punching section 11 is moved in the transverse direction (Step S6). The number of drive pulses for driving the punching section 11 after the lateral edges have been detected varies depending on the size of the sheet. The punching section 11 is inclined in accordance with the inclination of the sheet in the longitudinal direction. In this case, the number X' of drive pulses to be used after the lateral edges have been detected is corrected as follows (Step S7):

$$X'=X+Y \tag{2}$$

where X is the number of drive pulses used after the lateral edges have been detected, Y is the number of pulses for aligning the center of the sheet with the longitudinal direction, Y' is the number of drive pulses for moving the sheet in the longitudinal direction in accordance with the skew, and Z is the number of pulses for correcting the skew in the transverse direction, which corresponds to Y-Y'.

Figure 8:
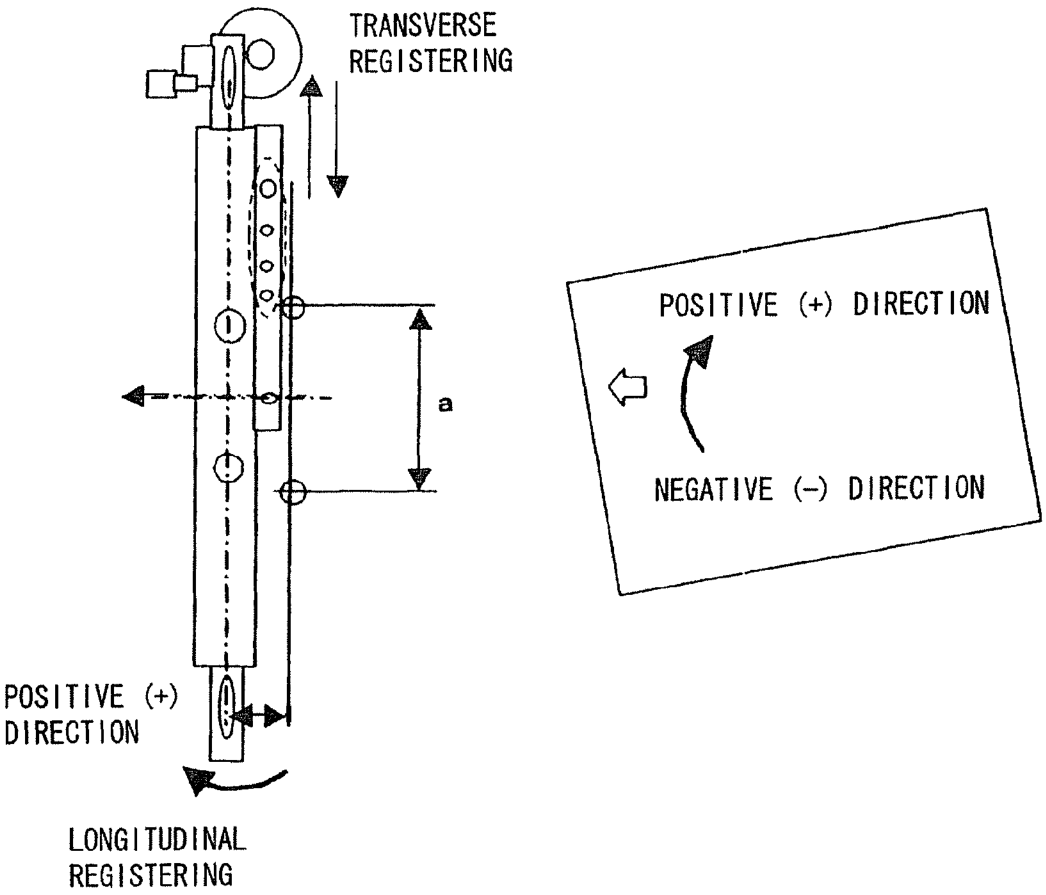
FIG. 8 is a diagram explaining how a sheet is registered with respect to the longitudinal direction and the transverse direction.

It will be explained how the skew is corrected if the sheet is inclined, for example, as shown in FIG. 8. In this case, the transverse registration and the longitudinal registration can be performed, each in the positive (+) direction and the negative (−) direction, as is illustrated in FIG. 8.

Assume that the sheet has size A, that the inter-sensor distance $\underline{a}$ is 166 mm, and that the skew-error distance $\underline{b}$ is 0.9 mm. Then, the skew angle is θ is ≈−0.3°.

In this case, the various drive amounts are as follows in terms of number of pulses:

A4-sheet drive (X) after the lateral-edge detection: 83 pulses

Sheet-center drive (Y) in longitudinal direction: 30 pulses

Actual drive (Y') in longitudinal direction: 24 pulses

Correction (Z) in transverse direction: −6 pulses (=24−30)

Actual drive (X') after the lateral-edge detection: 77 pulses (=83+(−6)).

The above-mentioned correction drive is performed on the punching section 11. Therefore, the sheet S is further transported downstream.

Figure 5:
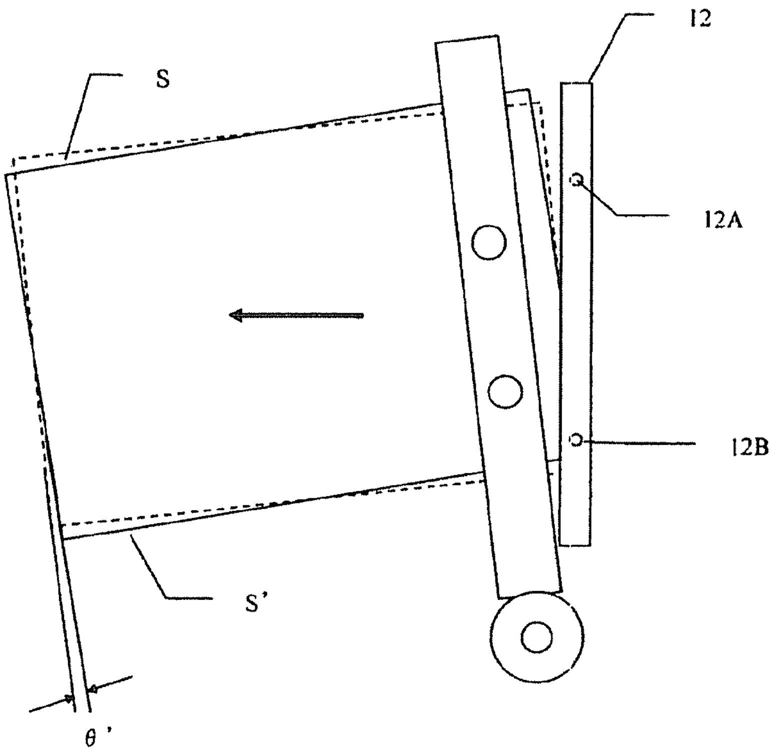
FIG. 5 is a diagram explaining another method of measuring a skew.

How the second skew is measured will be explained, with reference to FIG. 5. When the trailing edge of the sheet S passes the skew-detecting section 12, the first skew sensor 12A and the second skew sensor 12B performs the same process as the skew-measuring means (Step S3), at the timing of their state-change, from interception to transmission. Thus, the second skew is calculated (Step S8).

After the second skew has been calculated, it is determined whether the first skew and the second skew differ from each other (Step S9).

If no difference is found in Step S9, the punching section 11 holds the present angle.

Figure 6:
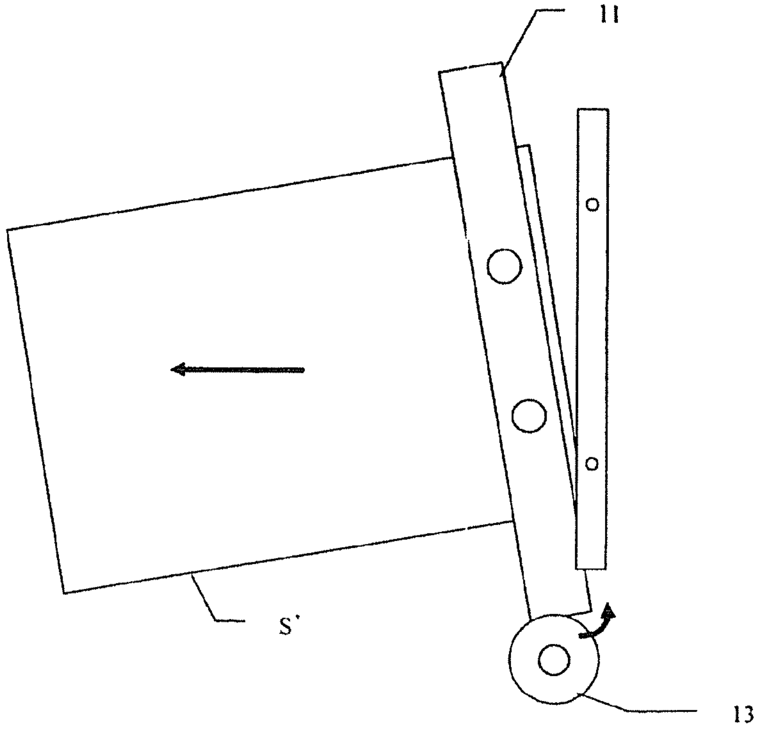
FIG. 6 is a diagram explaining how the punch unit is driven to correct the skew.

A skew may develop, however small it is, after the leading edge of the sheet S has passed the skew-detecting section 12 and before the trailing edge of the sheet S passes the skew-detecting section 12, and the sheet S may incline by angle θ', becoming an inclined sheet S'. When the inclined sheet S' passes the skew-detecting section 12, the error calculated in Step S6 is obtained as θ'. Hence, it is determined in Step S7 that there is an error. The longitudinal-registering motor 13 is driven by the number of pulses, which corresponds to the error angle θ'. The punching section 11 is thereby inclined, thus performing skew correction in respect of the second skew (Step S10). FIG. 6 illustrates how the motor 13 is driven to perform this skew correction.

Thereafter, the sheet is punched after the skew has been reliably corrected (Step S11). The sheet S punched is transported and ejected. The components of the punch unit 10 are set to their respective home positions (Step S12).

As has been described, the skew correction is performed at both the leading edge of the sheet and the trailing edge thereof, in the present invention. The skew can be detected even more correctly at the trailing edge than at the leading edge. Since the registering motors are first driven to register the sheet at the leading edge thereof, and are then driven to eliminate only the registration error at the trailing edge. This saves the motor-driving time. The motor-driving time, starting at the detection of the trailing edge, can therefore be shortened. Hence, the sheet-punching can be carried out at high speed.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A method of punching sheets by using a punch unit having a punching section configured to punch a sheet transported, comprising:

- a step of calculating a transverse-direction skew of a sheet at an upstream side of the punching section of the punch unit which punches the sheet transported as a function of times at which the sheet passes through first and second sensors which are spaced apart in a line intersecting at right angles with a direction in which the sheet is transported, prior to transport of the sheet to the punch unit;
- a step of rotating the punching section back and forth in the direction in which the sheet is transported, comprising:
  - rotating a lever shaft in accordance with the transverse-direction skew via rotation of a longitudinal-registering motor, connected to the lever shaft, thereby punch blades of the punching section are parallel to the transverse-direction of the sheet, and
  - rotating a tongue strip via the lever shaft, wherein the tongue strip intersects at a right angle with the direction in which the sheet is transported and rotates in a longitudinal direction; and
- a step of punching the sheet after adjusting the position of the punching section.

2. The method of claim 1, wherein the lever shaft is configured to engage an elongated hole which is provided in the punching section in which the lever shaft is at one end of an idler gear and rotates the tongue strip to enable the punching-section rotating mechanism to move in the longitudinal direction, wherein the longitudinal-registering motor has a gear set in mesh with the idle gear.

3. A method of punching sheets by using a punch unit having a punching section configured to punch a sheet transported, comprising:

- a step of sensing passage of a leading edge of a sheet at an upstream side of a punching section of the punch unit through first and second sensors which are spaced apart in a line intersecting at right angles with a direction in which the sheet is transported, prior to transport of the sheet to the punch unit;
- a step of calculating a first transverse-direction skew at the leading edge of the sheet as a function of a time at which the leading edge of the sheet passes through the first sensor and a time at which the leading edge of the sheet passes through the second sensor;
- a step of rotating the punching section back and forth in the direction in which the sheet is transported, comprising:
  - rotating a lever shaft in accordance with the first transverse-direction skew via rotation of a longitudinal-registering motor connected to the lever shaft, thereby punch blades of the punching section are parallel to the first transverse-direction of the sheet, and
  - rotating a tongue strip via the lever shaft, wherein the tongue strip intersects at a right angle with the direction in which the sheet is transported and rotates in a longitudinal direction;
- a step of sensing passage of a trailing edge of the sheet at an upstream side of a punching section of the punch unit through the first and second sensors prior to transport of the sheet to the punch unit;
- a step of calculating a second transverse-direction skew at the trailing edge of the sheet as a function of a time at which the trailing edge of the sheet passes through the first sensor and a time at which the trailing edge of the sheet passes through the second sensor;
- a step of rotating the punching section back and forth in the direction in which the sheet is transported in accordance with the second transverse-direction skew detected at the trailing edge, thereby punch blades of the punching section are parallel to the transverse-direction of the sheet; and
- a step of punching the sheet after adjusting the position of the punching section.

4. The method of claim 1, further comprising detecting a reference position of the punching section with a home-position sensor.

5. The method of claim 1, wherein the first and second sensors are transmission-type photosensors.

6. The method of claim 3, further comprising locating components of the punch unit at a home position before the step of detecting a passage of the leading edge of the sheet and returning the components to the home position after the step of punching the sheet.

7. The method of claim 3, wherein the steps of calculating the second transverse-direction skew at the leading edge and the trailing edge of the sheet include calculating the second transverse-direction skew at the leading edge with a first calculation unit and calculating the transverse-direction skew at the trailing edge of the sheet with a second calculation unit, wherein the first and the second calculation units are of the same type and incorporated in a control unit.

8. The method of claim 3, wherein the lever shaft is configured to engage an elongated hole which is provided in the punching section in which the lever shaft is at one end of an idler gear and rotates the tongue strip to enable the punching-section rotating mechanism to move in the longitudinal direction, wherein the longitudinal-registering motor has a gear set in mesh with the idle gear.

* * * * *